United States Patent
Motoyoshi (10) Patent No.: US 9,215,600 B2
(45) Date of Patent: Dec. 15, 2015

(54) RADIO WAVE PROPAGATION CHARACTERISTIC ESTIMATION APPARATUS, METHOD, AND COMPUTER PROGRAM

(75) Inventor: Masahiro Motoyoshi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 491 days.

(21) Appl. No.: 13/262,951

(22) PCT Filed: Apr. 12, 2010

(86) PCT No.: PCT/JP2010/002643
§ 371 (c)(1),
(2), (4) Date: Oct. 5, 2011

(87) PCT Pub. No.: WO2010/122731
PCT Pub. Date: Oct. 28, 2010

(65) Prior Publication Data
US 2012/0027068 A1 Feb. 2, 2012

(30) Foreign Application Priority Data
Apr. 21, 2009 (JP) .................................. 2009-103062

(51) Int. Cl.
*H04B 17/00* (2015.01)
*H04W 16/18* (2009.01)
*H04B 17/391* (2015.01)
*H04B 17/309* (2015.01)

(52) U.S. Cl.
CPC ........... *H04W 16/18* (2013.01); *H04B 17/0087* (2013.01); *H04B 17/309* (2015.01); *H04B 17/391* (2015.01)

(58) Field of Classification Search
USPC ............. 455/67.11, 67.13, 67.16, 226.3, 446, 455/423, 457, 456.2, 115.2, 456.4, 504, 455/429, 424, 151; 375/224, 227; 370/237, 370/342, 335, 331, 241
See application file for complete search history.

(56) References Cited

U.S. PATENT DOCUMENTS 5,561,841 A * 10/1996 Markus ......................... 455/446
6,341,223 B1 * 1/2002 Park ............................. 455/446
6,438,362 B1 * 8/2002 Amezawa .................. 455/226.3

(Continued)

FOREIGN PATENT DOCUMENTS

JP 2005020500 A 1/2005
JP 2009005250 A 1/2009

OTHER PUBLICATIONS

International Search Report for PCT/JP2010/002643 mailed Jun. 15, 2010.

*Primary Examiner* — Ganiyu A Hanidu (57) ABSTRACT

To estimate radio wave propagation characteristics with high estimation accuracy, even when used for a variety of purposes. An estimation technique determining unit determines, for each of groups classified in accordance with a measurement condition, an optimum radio wave propagation characteristic estimation technique from among a plurality of radio wave propagation characteristic estimation techniques, based on an actual measured value of radio waves. A radio wave propagation characteristic estimating unit discriminates a group corresponding to the given measurement condition, sets the optimum radio wave propagation characteristic estimation technique corresponding to the discriminated group, and estimates the radio wave propagation characteristics in accordance with the set radio wave propagation characteristic estimation technique.

12 Claims, 6 Drawing Sheets

(56) References Cited

U.S. PATENT DOCUMENTS

| | | |
|---|---|---|
| 7,085,697 B1 * | 8/2006 | Rappaport et al. .............. 703/13 |
| 7,634,265 B2 * | 12/2009 | Sugahara et al. ............. 455/423 |
| 7,844,264 B2 * | 11/2010 | Watanabe ..................... 455/423 |
| 8,160,594 B2 * | 4/2012 | Sato et al. ..................... 455/446 |
| 8,428,520 B2 * | 4/2013 | Kobayashi et al. ......... 455/67.13 |
| 2002/0107663 A1 * | 8/2002 | Furukawa et al. ............ 702/181 |
| 2010/0035569 A1 * | 2/2010 | Aoyama ..................... 455/226.4 |
| 2010/0255803 A1 * | 10/2010 | Sugahara et al. .......... 455/226.1 |

\* cited by examiner

| ABOVE-GROUND LEVEL OF TRANSMISSION ANTENNA: HIGH | | | | |
|---|---|---|---|---|
| DISTANCE BETWEEN TRANSMISSION POINT AND RECEPTION POINT | HF BAND | VHF BAND | UHF BAND | SHF BAND |
| 0~1km | G1 | G5 | G9 | G13 |
| 1~4km | G2 | G6 / D6 | G10 | G14 |
| 4~10km | G3 | G7 | G11 / D11 | G15 |
| 10km~ | G4 / D4 | G8 | G12 | G16 |

32

ACTUAL MEASURED VALUE STORAGE UNIT — 31

FIG. 3B

| ABOVE-GROUND LEVEL OF TRANSMISSION ANTENNA: LOW | | | | |
|---|---|---|---|---|
| DISTANCE BETWEEN TRANSMISSION POINT AND RECEPTION POINT | HF BAND | VHF BAND | UHF BAND | SHF BAND |
| 0~1km | G17 | G21 | G25 | G29 |
| 1~4km | G18 / D18 | G22 | G26 / D26 | G30 |
| 4~10km | G19 | G23 | G27 | G31 |
| 10km~ | G20 | G24 | G28 | G32 / D32 |

32

ACTUAL MEASURED VALUE STORAGE UNIT — 31

RADIO WAVE PROPAGATION CHARACTERISTIC ESTIMATION APPARATUS, METHOD, AND COMPUTER PROGRAM

TECHNICAL FIELD

The present invention relates to a radio wave propagation characteristic estimation apparatus, a method, and a computer program that can be used for a variety of purposes, such as determining the arrangement of base stations, wireless devices, and the like in a wireless communication system, and confirming a reception area for digital terrestrial broadcasting.

BACKGROUND ART

A radio wave propagation characteristic estimation system (radio wave propagation simulator) is used to assist in determining the arrangement of base stations, wireless devices, and the like in a wireless communication system. For example, in Patent Document 1, a radio wave propagation simulator is used to evaluate the reception power and delay spread at an arbitrary reception point, and a suitable location for installing a transmitting station is determined. As a result, this achieves greater efficiency in ensuring a two-dimensional communicable area, reducing the number of base stations that should be arranged, etc.

On the other hand, when actually measuring the radio waves in a service area on a regular basis while the network is operational, the actual measured value can be utilized to correct the estimated value of the radio wave propagation simulator, thereby making it possible to improve the estimation accuracy. In the past, there has been proposed a method that uses an actual measured value obtained at a specific point to improve the estimation accuracy for a whole region that will be the subject of estimation. For example, Patent Document 1 uses an actual measured value such as the electric field intensity to adjust parameters in the statistical formula until the mean square error between the estimated value and the actual measured value reaches its minimum. As a result, an improvement in the estimation accuracy is expected.

PRIOR ART DOCUMENT

Patent Document

Patent Document 1: Japanese Unexamined Patent Application, First Publication No. 2005-20500

DISCLOSURE OF INVENTION

Problems to be Solved by the Invention

However, in the method mentioned above, an improvement in the estimation accuracy cannot be expected in a case where the transmission point of the estimation subject differs from the transmission point when the actual measurement was taken. The reason for this is that the error between the estimated value and the actual measured value is greatly affected by the position of the antenna, and the parameters must be readjusted at another location where an actual measured value has not been obtained. Therefore, when installing a transmission point at a location where an actual measured value has not yet been obtained, it is not possible to utilize an actual measured value obtained in the past, limiting the application scene of the actual measured value.

The present invention has been realized to solve the problems described above, and an exemplary object thereof is to provide a radio wave propagation characteristic estimation apparatus, a method, and a computer program able to achieve high estimation accuracy, even when used for a variety of purposes.

Means for Solving the Problems

To solve the problems described above, the present invention is a radio wave propagation characteristic estimation apparatus which includes an estimation technique determining unit that determines, for each of groups classified in accordance with a measurement condition, an optimum radio wave propagation characteristic estimation technique from among a plurality of radio wave propagation characteristic estimation techniques, based on an actual measured value of radio waves, and a radio wave propagation characteristic estimating unit that discriminates a group corresponding to a given measurement condition, sets an optimum radio wave propagation characteristic estimation technique corresponding to the discriminated group, and estimates radio wave propagation characteristics in accordance with the set radio wave propagation characteristic estimation technique.

The present invention is a radio wave propagation characteristic estimation method which includes determining, for each of groups classified in accordance with a measurement condition, an optimum radio wave propagation characteristic estimation technique from among a plurality of radio wave propagation characteristic estimation techniques, based on an actual measured value of radio waves, discriminating a group corresponding to a given measurement condition, setting an optimum radio wave propagation characteristic estimation technique corresponding to the discriminated group, and estimating radio wave propagation characteristics in accordance with the set radio wave propagation characteristic estimation technique.

Effects of the Invention

The present invention determines, for each of groups classified in accordance with a measurement condition, the optimum radio wave propagation characteristic estimation technique from among a plurality of radio wave propagation characteristic estimation techniques, based on an actual measured value of radio waves, discriminates a group corresponding to a given measurement condition, sets the optimum radio wave propagation characteristic estimation technique corresponding to the discriminated group, and estimates the radio wave propagation characteristics in accordance with the set radio wave propagation characteristic estimation technique. Therefore, radio wave propagation characteristics can be estimated with higher accuracy with respect to any type of measurement conditions. Furthermore, in accordance with the present invention, the estimation accuracy can be improved as more actual measured values are stored.

MODE FOR CARRYING OUT THE INVENTION

Hereinafter, exemplary embodiments of the present invention will be described with reference to the drawings.

First Exemplary Embodiment

Figure 1:
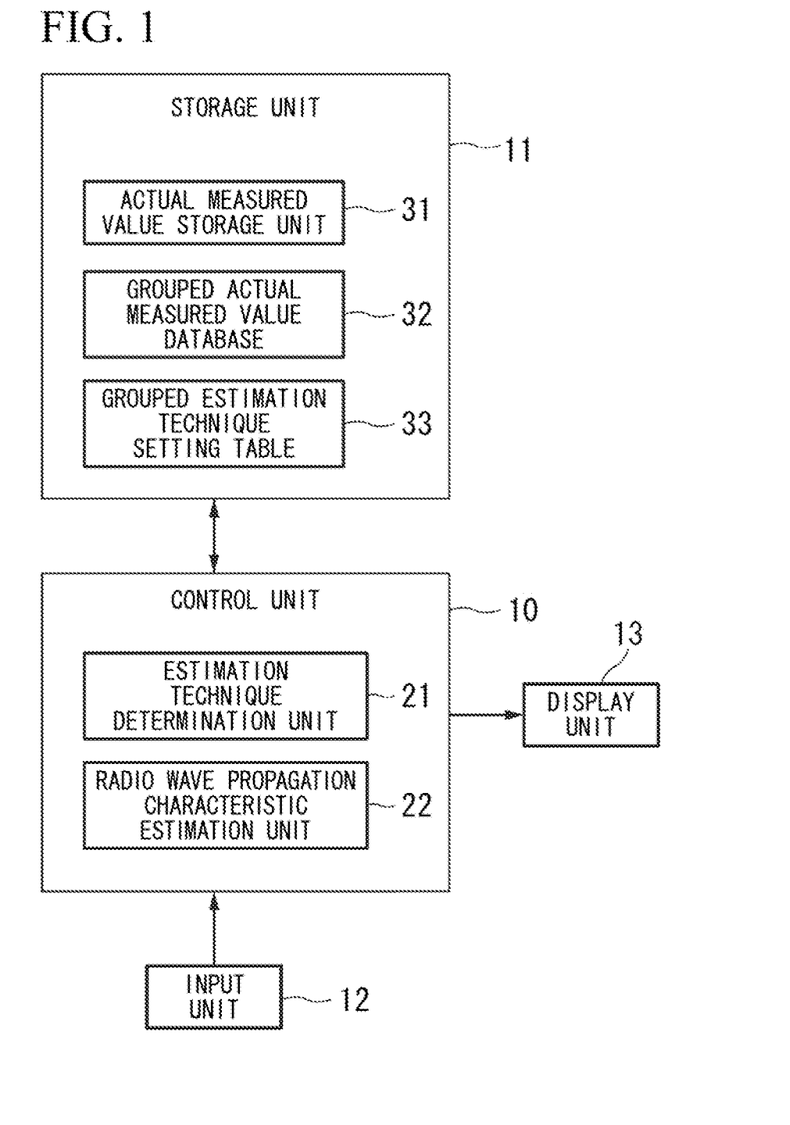
FIG. 1 is a block diagram showing the schematic configuration of a radio wave propagation characteristic estimation apparatus in a first exemplary embodiment of the present invention.

FIG. 1 is a block diagram showing the schematic configuration of a radio wave propagation characteristic estimation apparatus in a first exemplary embodiment of the present invention. As shown in FIG. 1, a radio wave propagation characteristic estimation apparatus includes a control unit 10, a storage unit 11, an input unit 12, and a display unit 13. The control unit 10 includes an estimation technique determination unit 21 and a radio wave propagation characteristic estimation unit 22.

For each of groups classified in accordance with measurement conditions, the estimation technique determination unit 21 determines the optimum radio wave propagation characteristic estimation technique, based on an actual measured value of the radio wave, such as the reception electric field intensity. The measurement conditions are conditions that greatly affect the radio wave propagation characteristics, e.g., all or a combination of some of the frequency of the radio wave, the above-ground level of the transmission antenna, and the distance between the transmission point and the reception point.

The radio wave propagation characteristic estimation techniques are, for example, ray tracing method, Okumura-Hata method, or plane-earth propagation model method. Ray tracing method treats the radio waves as the rays that travel in straight lines, geometrically traces the rays that are reflected by surrounding structures, transmit through surrounding structures, and diffracted by surrounding structures before they reach the reception point, and then determines the electric fields generated by the traced rays based on geometric optics theory. The Okumura-Hata method actually tests the radio wave propagation characteristics between a base station and a mobile station in each area (open ground, urban areas, small- and medium-sized cities, and cities), calculates an approximate formula for the radio wave propagation characteristics based on that totalized data, and estimates the radio wave propagation characteristics based on the calculated approximate formula. Plane-earth propagation model method estimates the radio wave propagation characteristics by making a model of the arrival of the radio waves for direct-waves and earth-reflected waves.

Many other radio wave propagation characteristic estimation techniques have been proposed. Each of these radio wave propagation characteristic estimation techniques has advantages and disadvantages, and it is not easy to say which radio wave propagation characteristic estimation technique is the best. For example, radio wave propagation characteristics are affected by conditions such as the frequency of the radio wave, the above-ground level of the transmission antenna, and the distance between the transmission point and the reception point, and the optimum radio wave propagation characteristic estimation technique differs depending on the measurement conditions.

For example, the higher the frequency of the radio wave, the more its characteristics resemble light, making it more easily affected by obstructions. Accordingly, when the radio waves have a high frequency, it is important to track the effects of reflection, transmission, and diffraction caused by structures. In contrast, when the radio waves have a low frequency, while they are not easily affected by obstructions such as buildings, not only direct waves but also surface waves and waves reflected from the ionized layer become important, When a radio wave propagation characteristic simulation command is input to the radio wave propagation characteristic estimation unit 22, the radio wave propagation characteristic estimation unit 22 discriminates the group from the given measurement conditions, sets the optimum radio wave propagation characteristic estimation technique for that group from among a plurality of radio wave propagation characteristic estimation techniques, and estimates the radio wave propagation characteristic in accordance with the set radio wave propagation characteristic estimation technique.

The storage unit 11 includes an actual measured value storage unit 31, a grouped actual measured value database 32, and a grouped estimation technique setting table 33. An actual measured value such as the reception electric field intensity is stored in the actual measured value storage unit 31. Actual measured value data for each group is stored in the grouped actual measured value database 32. The most suitable radio wave propagation characteristic estimation technique for each group is stored in the grouped estimation technique setting table 33 based on a calculated value of estimation accuracy determined by comparing an actual measured value with an estimated value.

The input unit 12 includes a keyboard, a mouse, and such like, and is used for inputting measurement conditions, actual measured value data, various types of parameters, etc. The display unit 13 includes, for example, a liquid crystal display (LCD), and displays various types of input screens, estimated values of radio wave propagation characteristics, etc.

In the first exemplary embodiment of the present invention, the estimation technique determination unit 21 determines, for each of groups classified in accordance with the measurement conditions, the optimum radio wave propagation characteristic estimation technique from among a plurality of radio wave propagation characteristic estimation techniques, based on the actual measured values. The radio wave propagation characteristic estimation unit 22 then discriminates the group corresponding to the given measurement conditions, sets the optimum radio wave propagation characteristic estimation technique corresponding to that group from among a plurality of radio wave propagation characteristic estimation techniques, and estimates the radio wave propagation characteristics in accordance with the set radio wave propagation characteristic estimation technique. Thus, since the radio wave propagation characteristic is estimated in accordance with the optimum radio wave propagation characteristic estimation technique, based on the actual measured values, a highly accurate estimation can be made.

Figure 2:
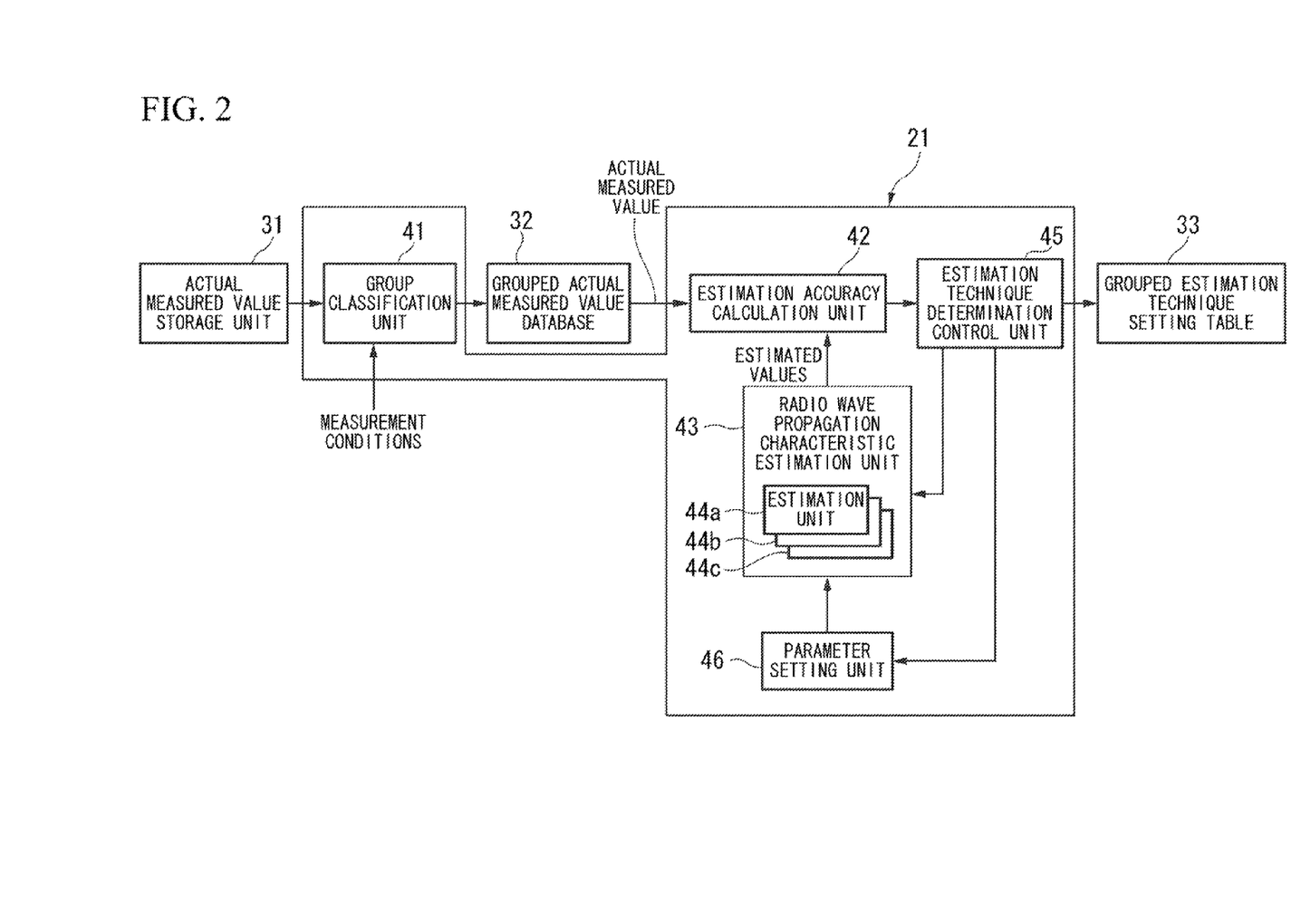
FIG. 2 is a function block diagram used in explaining an estimation technique determination unit in the first exemplary embodiment of the present invention.

FIG. 2 shows a functional block of the estimation technique determination unit 21, together with the actual measured value storage unit 31, the grouped actual measured value database 32, and the grouped estimation technique setting table 33 in the storage unit 11. In FIG. 2, an actual measured value data such as the reception electric field intensity is stored in the actual measured value storage unit 31. A group classification unit 41 classifies the actual measured value data for each group in accordance with measurement conditions that greatly affect the radio wave propagation characteristics, such as the frequency of the radio wave, the above-ground level of the transmission antenna, and the distance between the transmission point and the reception point, and creates the grouped actual measured value database 32 as shown in FIGS. 3A and 3B.

Figure 3A:
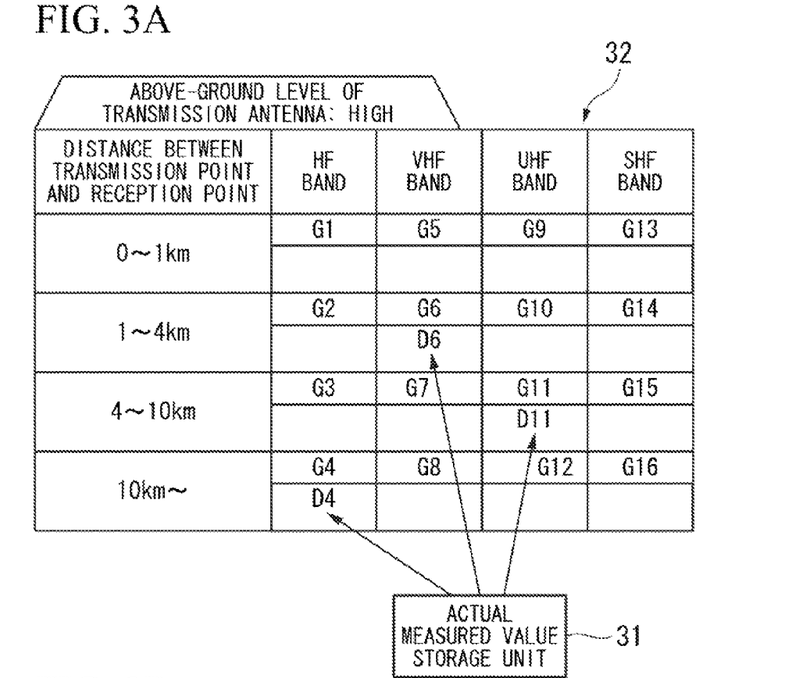
FIG. 3A is an explanatory diagram of a grouped actual measured value database in the first exemplary embodiment of the present invention.
Figure 3B:
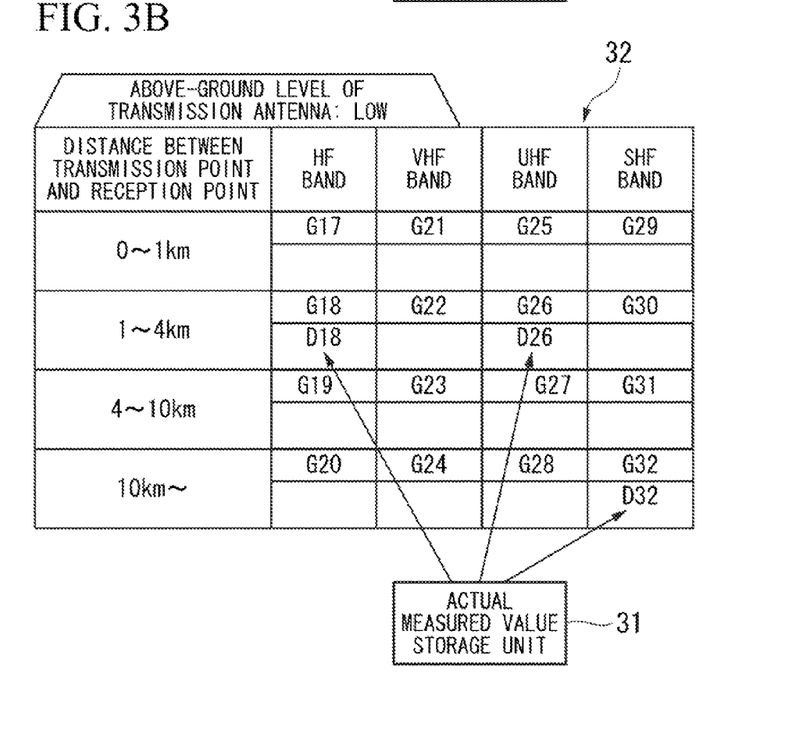
FIG. 3B is an explanatory diagram of a grouped actual measured value database in the first exemplary embodiment of the present invention.

In FIGS. 3A and 3B, the frequency of the radio wave, the above-ground level of the transmission antenna, and the distance between the transmission point and the reception point are used as the measurement conditions. A specific method of classifying the groups is, for example, to classify the radio wave frequencies into four types: high frequency (HF: short wave, 3 MHz to 30 MHz) band, very high frequency (VHF: very short wave, 30 MHz to 300 MHz) band, ultra high frequency (UHF: ultra short wave, 300 MHz to 3 GHz) band, and super high frequency (SHF: centimeter wave, 3 GHz to 30 GHz) band, to classify the above-ground level of the transmission antenna into two types: lower than the surrounding buildings (FIG. 3B) and higher than the surrounding buildings (FIG. 3A), and to classify the distance between the transmission point and the reception point into four types: less than 1 km, greater than or equal to 1 km and less than 4 km, greater than or equal to 4 km and less than 10 km, and greater than or equal to 10 km. In this case, since the number of groups is the combination of the types of the respective measurement conditions, the total number of groups is 32: groups G1 to G32.

For example, the group G11 corresponds to a case where the radio wave frequency is in the UHF band, the above-ground level of the transmission antenna is higher than the surrounding buildings, and the distance between the transmission point and the reception point is greater than or equal to 4 km and less than 10 km. In this case, actual measured value data D11 corresponding to the group G11 is extracted by the group classification unit 41 from the actual measured value data stored in the actual measured value storage unit 31, and the actual measured value data D11 is written in the grouped actual measured value database 32. Actual measured value data for each of groups G1 to G32 is similarly written to the grouped actual measured value database 32.

In FIG. 2, an estimation accuracy calculation unit 42 compares, for each of a plurality of radio wave propagation characteristic estimation techniques, actual measured value data with an estimated value at a location corresponding to that actual measured value data, and calculates the estimation accuracy.

A radio wave propagation characteristic estimation unit 43 includes estimation units corresponding to a plurality of estimation methods. Here, the radio wave propagation characteristic estimation unit 43 includes an estimation unit 44a that uses ray tracing method, an estimation unit 44b in accordance with the Okumura-Hata method, and an estimation unit 44c in accordance with the plane-earth propagation model method.

In this case, an estimation technique determination control unit 45 firstly sets the estimation unit to be used in radio wave propagation characteristic estimation to the estimation unit 44a for ray tracing method. A parameter setting unit 46 sets the parameters for ray tracing method. The estimation unit 44a calculates an estimated value using ray tracing method based on the set parameters. The estimation accuracy calculation unit 42 then compares the estimated value obtained by ray tracing method with the actual measured value, and calculates the estimation accuracy.

The estimation technique determination control unit 45 then sets the estimation unit to be used for radio wave propagation characteristic estimation to the estimation unit 44b for the Okumura-Hata method. The parameter setting unit 46 sets the parameters for the Okumura-Hata method. The estimation unit 44b calculates an estimated value using the Okumura-Hata method based on the set parameters. The estimation accuracy calculation unit 42 then compares the estimated value using the Okumura-Hata method with the actual measured value, and calculates the estimation accuracy.

Additionally, the estimation technique determination control unit 45 sets the estimation unit to be used for radio wave propagation characteristic estimation to the estimation unit 44c for the plane-earth propagation model method. The parameter setting unit 46 sets the parameters for the plane-earth propagation model method. The estimation unit 44c calculates an estimated value using the plane-earth propagation model method based on the set parameters. The estimation accuracy calculation unit 42 then compares the estimated value for the plane-earth propagation model method with the actual measured value, and calculates the estimation accuracy.

Figure 4A:
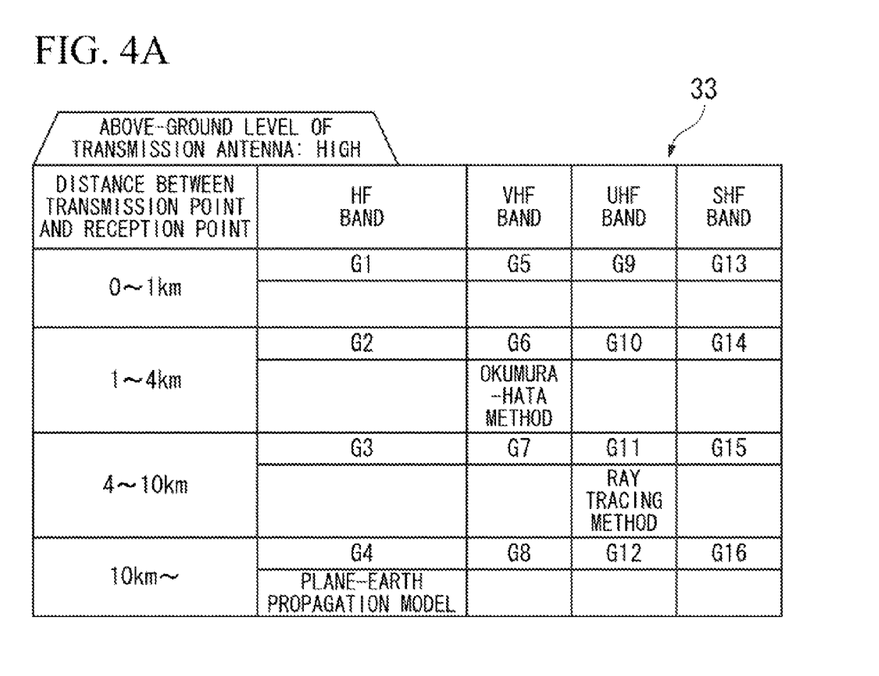
FIG. 4A is an explanatory diagram of a grouped estimation technique setting table in the first exemplary embodiment of the present invention.
Figure 4B:
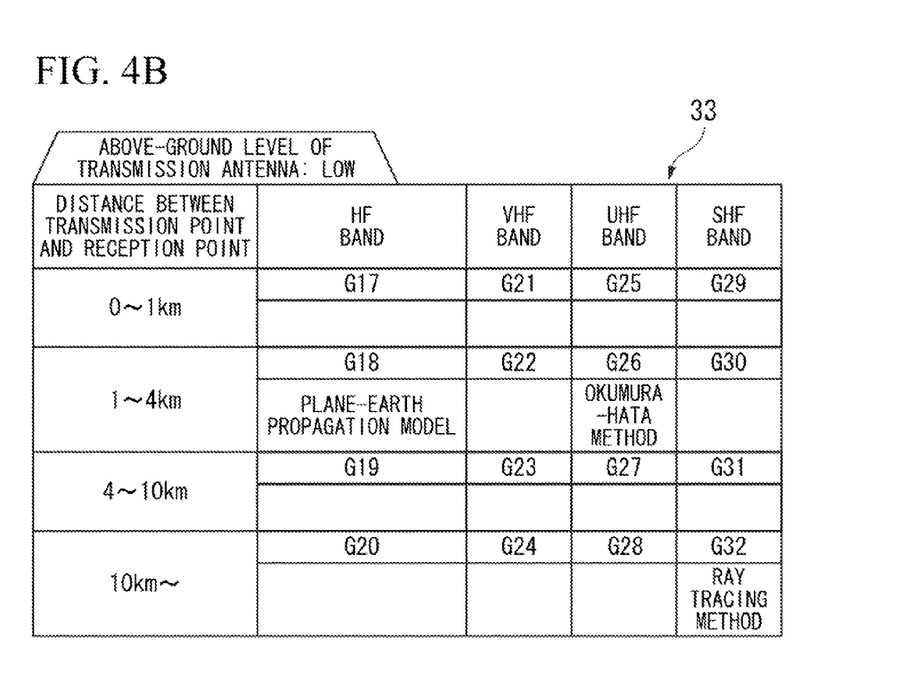
FIG. 4B is an explanatory diagram of a grouped estimation technique setting table in the first exemplary embodiment of the present invention.

In this manner, when the estimated values are calculated using a plurality of radio wave propagation characteristic estimation techniques, and the estimation accuracy is calculated by comparing these estimated values with the actual measured values, the estimation technique determination control unit 45 determines the radio wave propagation characteristic estimation technique for each group, based on the estimation accuracy. That is, the estimation technique determination control unit 45 determines, from among the estimated values for the plurality of radio wave propagation characteristic estimation techniques, the radio wave propagation characteristic estimation technique corresponding to the estimated value with the highest estimation accuracy to be the optimum radio wave propagation characteristic estimation technique for that group. As shown in FIGS. 4A and 4B, the radio wave propagation characteristic estimation technique determined in this manner for each group is stored in the grouped estimation technique setting table 33.

FIGS. 4A and 4B are examples of the grouped estimation technique setting table 33. For example, let us suppose that in group G11, in which the radio wave frequency is in the UHF band, the above-ground level of the transmission antenna is higher than the surrounding buildings, and the distance between the transmission point and the reception point is greater than or equal to 4 km and less than 10 km, when the estimation accuracy is calculated from the actual measured value data and the estimated values at the location corresponding to the actual measured value, the estimated value for ray tracing method is the most accurate. In this case, ray tracing method is written as the radio wave propagation characteristic estimation technique corresponding to the group G11 in the grouped estimation technique setting table 33. Similarly, the optimum radio wave propagation characteristic estimation technique for each of groups G1 to G32 is written in the grouped estimation technique setting table 33.

Figure 5:
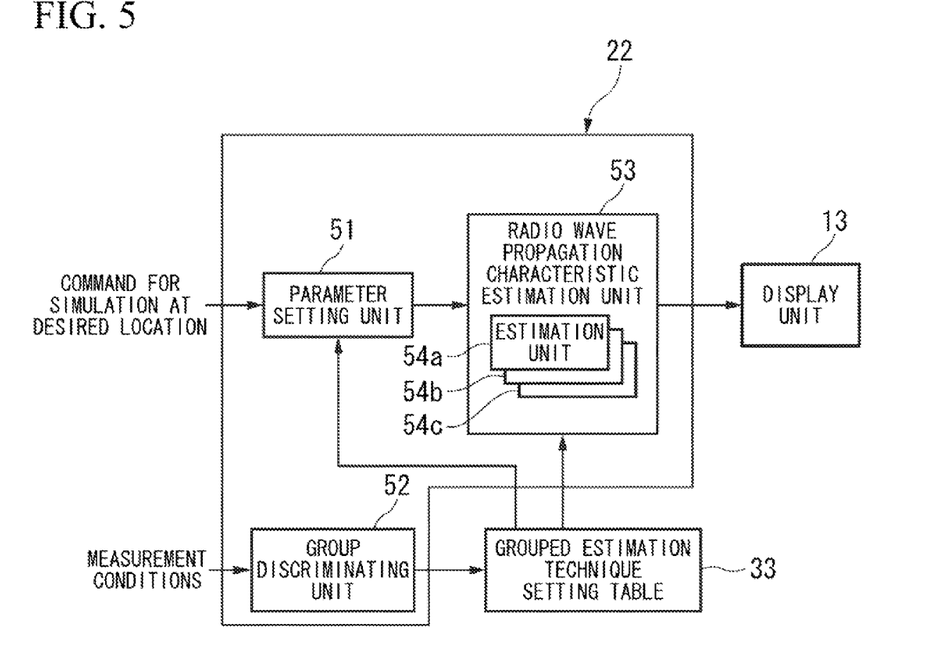
FIG. 5 is a function block diagram used in explaining a radio wave propagation characteristic estimation unit in the first exemplary embodiment of the present invention.

FIG. 5 is a diagram showing a function block of the radio wave propagation characteristic estimation unit 22, together with the display unit 13 and the grouped estimation technique setting table 33. In FIG. 5, when estimating the radio wave propagation characteristics, a command for a simulation at a desired location is input to a parameter setting unit 51. Also, measurement conditions are input to a group discriminating unit 52.

When measurement conditions are input, the group discriminating unit 52 discriminates the group corresponding to those measurement conditions. As described above, the groups are classified in accordance with, for example, the radio wave frequency, the above-ground level of the transmission antenna, and the distance between the transmission point and the reception point. The discriminated group is input to the grouped estimation technique setting table 33.

As shown in FIGS. 4A and 4B, the optimum radio wave propagation characteristic estimation technique for each group is stored in the grouped estimation technique setting table 33. When the group discriminated by the group discriminating unit 52 is input to the grouped estimation technique setting table 33, the grouped estimation technique setting table 33 reads the optimum radio wave propagation characteristic estimation technique of that group.

A radio wave propagation characteristic estimation unit 53 includes estimation units corresponding to a plurality of estimation methods. Here, the radio wave propagation characteristic estimation unit 53 includes an estimation unit 54a in accordance with ray tracing method, an estimation unit 54b in accordance with the Okumura-Hata method, and estimation unit 54c in accordance with the plane-earth propagation model method.

The radio wave propagation characteristic estimation unit 53 selects one of the estimation units 54a to 54c corresponding to the radio wave propagation characteristic estimation technique read from the grouped estimation technique setting table 33. Moreover, the parameter setting unit 51 sets the parameters in accordance with the radio wave propagation characteristic estimation technique read from the grouped estimation technique setting table 33. The parameter setting unit 51 sends the set parameters to the radio wave propagation characteristic estimation unit 53.

For example, let us suppose that data indicating that the radio wave frequency is 400 MHz, the above-ground level of the transmission antenna is higher than the surrounding buildings, and the distance of 8 km between the transmission point and the reception point, are input as measurement conditions to the group discriminating unit 52.

In this case, since the frequency is in the UHF band, the above-ground level of the transmission antenna is higher than the surrounding buildings, and the distance between the transmission point and the reception point is greater than or equal to 4 km and less than 10 km, the group discriminating unit 52 discriminates that the group corresponding to these measurement conditions is the group G11. When the optimum radio wave propagation characteristic estimation technique of group G11 is read from the grouped estimation technique setting table 33 shown in FIG. 4A, data indicating ray tracing method is read. Therefore, in this case, the radio wave propagation characteristic estimation unit 53 sets the estimation unit 54a in accordance with ray tracing method as the estimation unit to be used for radio wave propagation characteristic estimation. Moreover, the parameter setting unit 51 outputs parameters corresponding to ray tracing method. The estimated value determined by the estimation unit 54a in accordance with ray tracing method is then displayed at the display unit 13.

As described above, in the first exemplary embodiment of the present invention, the estimation technique determination unit 21 determines, for each of groups classified in accordance with measurement conditions, the optimum radio wave propagation characteristic estimation technique, based on the actual measured values. The radio wave propagation characteristic estimation unit 22 then discriminates the group corresponding to the given measurement conditions, sets the optimum radio wave propagation characteristic estimation technique for that group from among a plurality of radio wave propagation characteristic estimation techniques, and estimates the radio wave propagation characteristics in accordance with the set radio wave propagation characteristic estimation technique. Since the radio wave propagation characteristics are thus estimated by the optimum radio wave propagation characteristic estimation technique, based on the actual measured values, the estimation can be performed with high accuracy.

Figure 6:
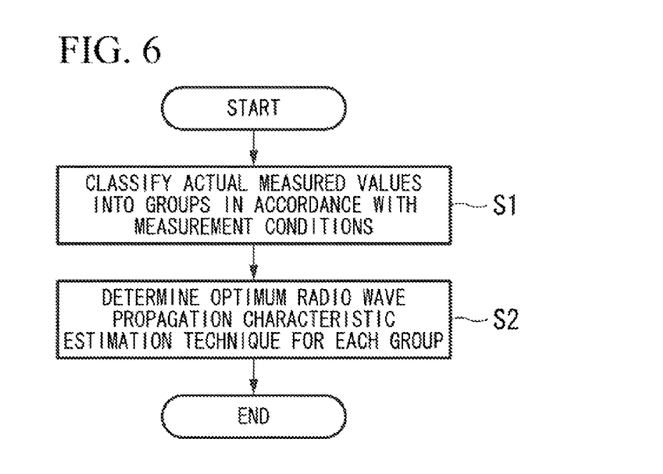
FIG. 6 is a flowchart used in explaining an estimation technique determination unit in the first exemplary embodiment of the present invention.

FIG. 6 is a flowchart showing a process at the estimation technique determination unit 21. In FIG. 6, firstly, the estimation technique determination unit 21 classifies the actual measured values into groups in accordance with the measurement conditions (Step S1). For example, the radio wave frequency, the above-ground level of the transmission antenna, and the distance between the transmission point and the reception point can be used as the measurement conditions.

The estimation technique determination unit 21 then determines the optimum radio wave propagation characteristic estimation technique in each group (Step S2), and writes that radio wave propagation characteristic estimation technique in the grouped estimation technique setting table 33.

Figure 7:
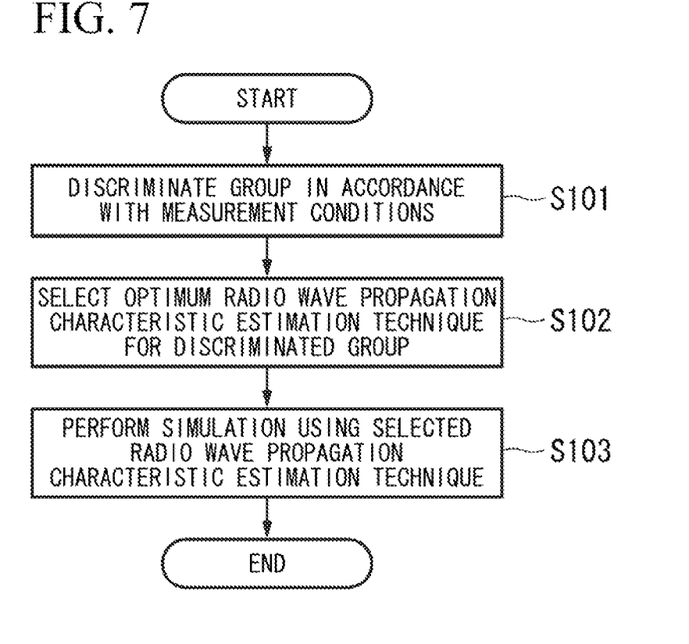
FIG. 7 is a flowchart used in explaining a radio wave propagation characteristic estimation unit in the first exemplary embodiment of the present invention.

FIG. 7 is a flowchart showing a process at the radio wave propagation characteristic estimation unit 22. In FIG. 7, firstly, the radio wave propagation characteristic estimation unit 22 discriminates the group in accordance with the measurement conditions (Step S101).

The radio wave propagation characteristic estimation unit 22 then uses the grouped estimation technique setting table 33 to set the optimum radio wave propagation characteristic estimation technique for the discriminated group (Step S102).

The radio wave propagation characteristic estimation unit 22 then performs a radio wave propagation simulation in response to a request from the user (Step S103). At this time, the radio wave propagation characteristic estimation unit 22 performs the radio wave propagation simulation using the optimum radio wave propagation characteristic estimation technique for the discriminated group. It is to be noted that if only a few actual measured values have been stored, there are cases where the grouped actual measured value database 32 does not contain an actual measured value corresponding to the discriminated group. In such a case, the estimation technique determination unit 21 does not estimate the optimum radio wave propagation characteristic estimation technique relating to the discriminated group, and the optimum radio wave propagation characteristic estimation technique relating to the discriminated group is not stored in the grouped estimation technique setting table 33. In that case, a radio wave propagation characteristic estimation technique of a group which the corresponding measurement conditions most closely resemble (for example, in FIGS. 4A and 4B, one of the groups adjacent to the discriminated group) can be used.

It is to be noted that the process of the estimation technique determination unit 21 need not be performed for every radio wave propagation simulation, and is preferably performed on a regular basis depending on the storage level of the actual measured values.

Second Exemplary Embodiment

In the exemplary embodiment described above, estimated values are calculated using a plurality of radio wave propagation characteristic estimation techniques, and the estimated value with the highest estimation accuracy among the plurality of calculated estimated values is determined as the optimum radio wave propagation characteristic estimation technique for that group. This is because accuracy is deemed to be the most important factor in determining the optimum radio wave propagation characteristic estimation technique.

However, when estimating radio wave propagation characteristics, in addition to the estimation accuracy, other factors are also important (e.g., computation time). Accordingly, the optimum radio wave propagation characteristic estimation technique can be determined by incorporating the factor of computation time in addition to the estimation accuracy. That is, a radio wave propagation characteristic estimation technique that calculates the estimated value in a computation time that is shorter than the computation time of the radio wave propagation characteristic estimation technique that obtains the highest estimation accuracy, and is below a predetermined value, can be determined as the optimum radio wave propagation characteristic estimation technique. For example, the computation time of ray tracing method is longer than that of the Okumura-Hata method. Accordingly, for example, even in a case where the estimation accuracy obtained with ray tracing method is better than the estimation accuracy obtained with the Okumura-Hata method, if the computation time of radio wave propagation characteristic estimation in accordance with the Okumura-Hata method is below the predetermined value, the Okumura-Hata method can be used.

While the present invention has been particularly shown and described with reference to exemplary embodiments thereof, the present invention is not limited to those exemplary embodiments. It will be understood by those of ordinary skill in the art that various changes in form and details may be made therein without departing from the spirit and scope of the present invention as defined in the claims.

It is to be noted that the present invention can be realized using a program for carrying out a computer operation for realizing the functions described above. For example, the functions described above can be stored on a computer-readable recording medium in the form of a program, and realized by making a computer read and execute the program. Here, the computer-readable recording medium denotes a magnetic disc, a magneto-optical disc, a compact disc read-only memory (CD-ROM), a digital versatile disc (DVD)-ROM, a semiconductor memory, etc. The program can also be distributed to a computer via a communication line, and executed by the computer to which the program is distributed. The program can be one that realizes some of the functions described above. Moreover, the program can be a so-called differential file (differential program) that realizes the functions described above in combination with a program already stored in a computer system.

The present invention can also be realized using hardware for realizing the functions described above.

This application is based upon and claims the benefit of priority from Japanese Patent Application No. 2009-103062, filed on Apr. 21, 2009, the disclosure of which is incorporated herein in its entirety by reference.

INDUSTRIAL APPLICABILITY

The present invention can be used for a variety of purposes such as determining the arrangement of base stations, wireless devices, and the like in a wireless communication system, and confirming a reception area for digital terrestrial broadcasting. In accordance with the present invention, radio wave propagation characteristic can be estimated with high accuracy with respect to any type of measurement conditions. Furthermore, in accordance with the present invention, the estimation accuracy can be improved as more actual measured values are stored.

DESCRIPTION OF REFERENCE SYMBOLS 10 control unit
11 storage unit
12 input unit
13 display unit
21 estimation technique determination unit (estimation technique determining unit)
22 radio wave propagation characteristic estimation unit (radio wave propagation characteristic estimating unit)
31 actual measured value storage unit
32 grouped actual measured value database (actual measured value storage unit)
33 grouped estimation technique setting table (estimation technique storage unit)
41 group classification unit
42 estimation accuracy calculation unit
43 radio wave propagation characteristic estimation unit
44a to 44c estimation units
45 estimation technique determination control unit
46 parameter setting unit
51 parameter setting unit
52 group discriminating unit
53 radio wave propagation characteristic estimation unit
54a to 54c estimation units

The invention claimed is:

1. A radio wave propagation characteristic estimation apparatus comprising:
    at least one processor communicatively coupled to a network, wherein the at least one processor is configured to:
        determine, for each of groups of combinations of measurement conditions classified in accordance with a measurement condition, an optimum radio wave propagation characteristic estimation technique from among a plurality of radio wave propagation characteristic estimation techniques, based on an actual measured value of radio waves, wherein the plurality of radio wave propagation characteristic estimation techniques include at least one of a ray tracing method, an Okumura-Hata method, and a plane-earth propagation model method;
        discriminate a group corresponding to a given measurement condition;
        set an optimum radio wave propagation characteristic estimation technique corresponding to the discriminated group; and
        estimate radio wave propagation characteristics in accordance with the set radio wave propagation characteristic estimation technique,
        wherein the measurement condition comprises at least one of a frequency of the radio waves, an above-ground level of a transmission antenna, and a distance between a transmission point and a reception point.

2. The radio wave propagation characteristic estimation apparatus according to claim 1, wherein the at least one processor is further configured to:
    determine the optimum radio wave propagation characteristic estimation technique based on calculated values of estimation accuracy,
    wherein the calculated values of estimation accuracy are determined by comparing estimated values respectively obtained by radio wave propagation characteristic estimation in accordance with the plurality of radio wave propagation characteristic estimation techniques with the actual measured value.

3. The radio wave propagation characteristic estimation apparatus according to claim 2, wherein the optimum radio wave propagation characteristic estimation technique obtains a highest estimation accuracy among the calculated values of estimation accuracy.

4. The radio wave propagation characteristic estimation apparatus according to claim 2, wherein the at least one processor is further configured to determine the optimum radio wave propagation characteristic estimation technique based on a plurality of estimated computation times in accordance with the plurality of radio wave propagation characteristic estimation techniques.

5. The radio wave propagation characteristic estimation apparatus according to claim 4, wherein the optimum radio wave propagation characteristic estimation technique includes a shorter estimated computation time than a longer estimated value computation time of the radio wave propagation characteristic estimation technique that obtains a highest estimation accuracy.

6. The radio wave propagation characteristic estimation apparatus according to claim 1, wherein the at least one processor is further configured to store the optimum radio wave propagation characteristic estimation technique for the discriminated group.

7. A non-transitory computer readable storage medium for radio wave propagation characteristic estimation comprising:
    at least one processor readable storage medium; and instructions stored on the at least one storage medium; wherein the instructions are configured to be readable from the at least one medium by the at least one processor to cause the at least one processor to operate according to the apparatus of claim 1.

8. A radio wave propagation characteristic estimation method comprising:
    measuring, using at least one processor communicatively coupled to a network, an actual measured value of radio waves received by at least one antenna communicatively coupled to the network;
    determining, using the at least one processor, for each of groups of combinations of measurement conditions classified in accordance with a measurement condition, an optimum radio wave propagation characteristic estimation technique from among a plurality of radio wave propagation characteristic estimation techniques, based on the actual measured value of the radio waves, wherein the plurality of radio wave propagation characteristic estimation techniques include at least one of a ray tracing method, an Okumura-Hata method, and a plane-earth propagation model method;
    discriminating, using the at least one processor, a group corresponding to a given measurement condition;
    setting, using the at least one processor, an optimum radio wave propagation characteristic estimation technique corresponding to the discriminated group; and
    estimating, using the at least one processor, radio wave propagation characteristics in accordance with the set radio wave propagation characteristic estimation technique,
    wherein the measurement condition comprises at least one of a frequency of the radio waves, an above-ground level of a transmission antenna, and a distance between a transmission point and a reception point.

9. The radio wave propagation characteristic estimation apparatus according to claim 1, wherein the measurement condition comprises a combination of at least two of the frequency of the radio waves, the above-ground level of a transmission antenna, and the distance between a transmission point and a reception point.

10. The radio wave propagation characteristic estimation method according to claim 8, wherein the measurement condition comprises a combination of at least two of a frequency of the radio waves, an above-ground level of a transmission antenna, and a distance between a transmission point and a reception point.

11. The radio wave propagation characteristic estimation apparatus according to claim 1, wherein the plurality of radio wave propagation characteristic estimation techniques comprise the ray tracing method, the Okumura-Hata method, and the plane-earth propagation model method.

12. The radio wave propagation characteristic estimation method according to claim 8, wherein the plurality of radio wave propagation characteristic estimation techniques comprise the ray tracing method, the Okumura-Hata method, and the plane-earth propagation model method.

* * * * *